(12) United States Patent
Chen et al.

(10) Patent No.: US 11,388,663 B2
(45) Date of Patent: Jul. 12, 2022

(54) ADVANCED V2X COMMUNICATION MECHANISM

(71) Applicant: MEDIATEK SINGAPORE PTE. LTD., Singapore (SG)

(72) Inventors: Tao Chen, Beijing (CN); Feifei Zhang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/964,788

(22) PCT Filed: Sep. 27, 2019

(86) PCT No.: PCT/CN2019/108528
§ 371 (c)(1),
(2) Date: Jul. 24, 2020

(87) PCT Pub. No.: WO2020/063857
PCT Pub. Date: Apr. 2, 2020

(65) Prior Publication Data
US 2021/0360520 A1    Nov. 18, 2021

(30) Foreign Application Priority Data

Sep. 28, 2018  (CN) ................ PCT/CN2018/108377
Sep. 28, 2018  (CN) ................ PCT/CN2018/108378

(51) Int. Cl.
*H04W 48/20*   (2009.01)
*H04L 1/18*    (2006.01)
(Continued)

(52) U.S. Cl.
CPC ........... *H04W 48/20* (2013.01); *H04L 1/0061* (2013.01); *H04L 1/1896* (2013.01);
(Continued)

(58) Field of Classification Search
None
See application file for complete search history.

(56) References Cited

U.S. PATENT DOCUMENTS 10,334,586 B2 *  6/2019  Gulati ............... H04W 72/0446
11,140,697 B2 * 10/2021  Hu ....................... H04B 7/0626
(Continued)

FOREIGN PATENT DOCUMENTS

CN         108923894 A      11/2018

OTHER PUBLICATIONS

Combined Taiwanese Office Action and Search Report dated Feb. 26, 2021 in Taiwanese Patent Application No. 109121997, 10 pages.
(Continued)

*Primary Examiner* — Hong S Cho
(74) *Attorney, Agent, or Firm* — Oblon, McClelland, Maier & Neustadt, L.L.P.

(57) ABSTRACT

A method for sidelink data retransmission can include receiving a first negative acknowledgement (NACK) at a base station (BS) from a receiver user equipment (Rx UE). The NACK corresponds to an original transmission of sidelink data over a sidelink from a transmitter user equipment (Tx UE). The method can further include selecting one or both of the BS and the Tx UE to perform a first retransmission of the sidelink data to the Rx UE. A method of sidelink synchronization can include selecting at a UE a timing reference with a highest priority among available sidelink synchronization timing references according to a rule indicating timing references listed from high priority to low priority: gNB or eNB; UE directly synchronized to gNB or eNB; UE indirectly synchronized to gNB or eNB; GNSS; UE directly synchronized to GNSS; UE indirectly synchronized to GNSS; and remaining UEs.

18 Claims, 13 Drawing Sheets

(51) Int. Cl.
  *H04W 56/00* (2009.01)
  *H04W 72/14* (2009.01)
  *H04L 1/00* (2006.01)
  *H04W 76/11* (2018.01)
  *H04L 5/00* (2006.01)
  *H04W 92/18* (2009.01)
  *H04W 4/40* (2018.01)

(52) U.S. Cl.
  CPC ......... *H04L 5/0048* (2013.01); *H04W 56/001* (2013.01); *H04W 56/0015* (2013.01); *H04W 72/14* (2013.01); *H04W 76/11* (2018.02); *H04W 4/40* (2018.02); *H04W 92/18* (2013.01)

(56) References Cited

U.S. PATENT DOCUMENTS

| | | | | |
|---|---|---|---|---|
| 2017/0347394 | A1* | 11/2017 | Yasukawa | H04L 1/1864 |
| 2019/0182840 | A1 | 6/2019 | Feng et al. | |
| 2019/0268920 | A1* | 8/2019 | Falahati | H04W 88/021 |
| 2019/0342047 | A1* | 11/2019 | Kim | H04W 72/046 |
| 2019/0342910 | A1* | 11/2019 | Cao | H04W 72/1289 |
| 2020/0178292 | A1* | 6/2020 | Kim | H04W 72/042 |

OTHER PUBLICATIONS

"Further discussion on SLSS detection requirements for V2X", Huawei, HiSilicon. 3GPP TSG-RAN WG4 Meeting #82 R4-1701340; Athens. Greece, Feb. 13-17, 2017 [公開日:Feb. 13-Feb. 17, 2017]: [https://www.3gpp.org/ftp/tsg_ran/WG4_Radio/TSGR4_82/Docs/R4-1701340.zip], pp. 1-2.

"Sidelink Synchronization for NR V2X Communication". Intel Corporation, 3GPP TSG RAN WG1 Meeting #94 R1-1808695; Gothenburg, Sweden, Aug. 20-24, 2018 [公開日:Aug. 20-24, 2018]; [https://www.3gpp.org/ftp/TSG_RAN/WG1_RL1/TSGR1_94/Docs/R1-1808695.zip] 第1~4頁 1~4第1~4頁, pp. 1-11.

Combined Taiwanese Office Action and Search Report dated Dec. 30, 2020 in Taiwanese Patent Application No. 109121993 (with English translation of Category of Cited Documents), 9 pages.

"Considerations on Resource Allocation of NR V2X Sidelink", CAICT, 3GPP TSG RAN WG1 Meeting #94, R1-1809287, 7.2.4.1.4, Aug. 20-24, 2018, 6 pages.

Combined Taiwanese Office Action and Search Report dated Feb. 23, 2022 in corresponding Taiwanese Patent Application No. 109121993 (with English Translation of Category of Cited Documents), 6 pages.

\* cited by examiner

FIG. 6

| gNB-BASED SYNCHRONIZATION | GNSS-BASED SYNCHRONIZATION |
|---|---|
| R1-1a | R1-1b |
| InC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY<br>OoC: PCELL/SERVING CELL | GNSS > NR_UE$_{GNSS}$ > gNB (FOLLOWING R1-1a) |

FIG. 7

| | gNB-BASED SYNCHRONIZATION | GNSS-BASED SYNCHRONIZATION |
|---|---|---|
| | R1-2a: 6 PRIORITY GROUPS (PGs)<br>- ORDERED BY PG.<br>- ORDERED BY S-RSRP IN THE SAME PG. | R1-2b:<br>- ORDERED BY PG.<br>- ORDERED BY S-RSRP IN THE SAME PG. |
| PG1 | NR_UE$_{gNB}$ | RELIABLE GNSS |
| PG2 | NR_US$_{NR\_UE-gNB}$ | NR_UE$_{gNB}$ AND NR_UE$_{GNSS}$ |
| PG3 | RELIABLE GNSS | NR_UE$_{NR\_UE-gNB}$ AND NR_UE$_{NR\_UE-GNSS}$ |
| PG4 | NR_UE$_{GNSS}$ | NR_UE$_{OTHER}$ |
| PG5 | NR_UE$_{NR\_UE-GNSS}$ | |
| PG6 | NR-UE$_{OTHER}$ | |

| gNB-BASED SYNCHRONIZATION | eNB-BASED SYNCHRONIZATION | GNSS-BASED SYNCHRONIZATION |
|---|---|---|
| R2-1a:<br>- ORDERED BY PG.<br>- ORDERED BY S-RSRP IN THE SAME PG. | R2-1b:<br>- ORDERED BY PG.<br>- ORDERED BY S-RSRP IN THE SAME PG. | R2-1c |
| PG1:<br>InC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY<br>OoC: PCELL/SERVING CELL OF NR | PG1:<br>InC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY<br>OoC: PCELL/SERVING CELL OF LTE | GNSS>NR_UE$_{GNSS}$<br>> gNB OR eNB (FOLLOWING R2-1a or R2-1b) |
| PG2:<br>PCELL/SERVING CELL OF LTE | PG2:<br>PCELL/SERVING CELL OF NR | |

*FIG. 8*

|  | gNB-BASED SYNCHRONIZATION | eNB-BASED SYNCHRONIZATION | GNSS-BASED SYNCHRONIZATION |
|---|---|---|---|
|  | R2-2a:<br>- ORDERED BY PG.<br>- ORDERED BY S-RSRP IN THE SAME PG. | R2-2b:<br>- ORDERED BY PG.<br>- ORDERED BY S-RSRP IN THE SAME PG. | R2-2c:<br>- ORDERED BY PG.<br>- ORDERED BY S-RSRP IN THE SAME PG. |
| PG1 | NR_UE$_{gNB}$ | NR_UE$_{eNB}$ | RELIABLE GNSS |
| PG2 | NR_UE$_{NR\_UE-gNB}$ | NR_UE$_{NR\_UE-eNB}$<br>NR_UE$_{LTE\_UE-eNB}$ | NR_UE$_{GNSS}$<br>NR_UE$_{gNB}$<br>NR_UE$_{eNB}$ |
| PG3 | RELIABLE GNSS | RELIABLE GNSS | NR_UE$_{LTE\_UE-GNSS}$<br>NR_UE$_{NR\_UE-GNSS}$<br>NR_UE$_{NR\_UE-eNB}$<br>NR_UE$_{LTE\_UE-eNB}$<br>NR_UE$_{NR\_UE-gNB}$ |
| PG4 | NR_UE$_{GNSS}$ | NR_UE$_{GNSS}$ | NR_UE$_{OTHER}$ |
| PG5 | NR_UE$_{LTE\_UE-GNSS}$<br>NR_UE$_{NR\_UE-GNSS}$ | NR_UE$_{LTE\_UE-GNSS}$<br>NR_UE$_{NR\_UE-GNSS}$ |  |
| PG6 | NR_UE$_{OTHER}$ | NR_UE$_{OTHER}$ |  |

FIG. 9

| gNB-BASED SYNCHRONIZATION | | GNSS-BASED SYNCHRONIZATION |
|---|---|---|
| R3-1a | | R3-1b |
| INC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY<br>OOC: PCELL/SERVING CELL | | GNSS > NR_UE$_{GNSS}$ ≥ LTE_UE$_{GNSS}$ > gNB (FOLLOWING R3-1a) |

| | gNB-BASED SYNCHRONIZATION | eNB-BASED SYNCHRONIZATION | GNSS-BASED SYNCHRONIZATION |
|---|---|---|---|
| | R3-2a:<br>- ORDERED BY PG.<br>- ORDERED BY S-RSRP IN THE SAME PG. | R3-2b:<br>- ORDERED BY PG.<br>- ORDERED BY S-RSRP IN THE SAME PG. | R3-2c:<br>- ORDERED BY PG.<br>- ORDERED BY S-RSRP IN THE SAME PG. |
| PG1 | $NR\_UE_{gNB}$ | $LTE\_UE_{eNB}$ | RELIABLE GNSS |
| PG2 | $NR\_UE_{NR\_UE-gNB}$ | $NR\_UE_{NR\_UE-eNB}$<br>$NR\_UE_{LTE\_UE-eNB}$<br>$LTE\_UE_{LTE\_UE-eNB}$ | $NR\_UE_{GNSS}$<br>$LTE\_UE_{GNSS}$<br>$NR\_UE_{gNB}$<br>$NR\_UE_{eNB}$<br>$LTE\_UE_{eNB}$ |
| PG3 | RELIABLE GNSS | RELIABLE GNSS | $LTE\_UE_{LTE\_UE-GNSS}$<br>$NR\_UE_{LTE\_UE-GNSS}$<br>$NR\_UE_{NR\_UE-GNSS}$<br>$NR\_UE_{NR\_UE-eNB}$<br>$NR\_UE_{LTE\_UE-eNB}$<br>$LTE\_UE_{LTE\_UE-eNB}$<br>$NR\_UE_{NR\_UE-gNB}$ |
| PG4 | $NR\_UE_{GNSS}$<br>$LTE\_UE_{GNSS}$ | $NR\_UE_{GNSS}$<br>$LTE\_UE_{GNSS}$ | $NR\_UE_{OTHER}$<br>$LTE\_UE_{OTHER}$ |
| PG5 | $LTE\_UE_{LTE\_UE-GNSS}$<br>$NR\_UE_{LTE\_UE-GNSS}$<br>$NR\_UE_{NR\_UE-GNSS}$ | $LTE\_UE_{LTE\_UE-GNSS}$<br>$NR\_UE_{LTE\_UE-GNSS}$<br>$NR\_UE_{NR\_UE-GNSS}$ | |
| PG6 | $NR\_UE_{OTHER}$<br>$LTE\_UE_{OTHER}$ | $NR\_UE_{OTHER}$<br>$LTE\_UE_{OTHER}$ | |

| gNB-BASED SYNCHRONIZATION | eNB-BASED SYNCHRONIZATION | GNSS-BASED SYNCHRONIZATION |
|---|---|---|
| R4-1a:<br>- ORDERED BY PG.<br>- ORDERED BY S-RSRP IN THE SAME PG. | R4-1b:<br>- ORDERED BY PG.<br>- ORDERED BY S-RSRP IN THE SAME PG. | R4-1c:<br>GNSS > NR_UE$_{GNSS}$ > LTE_UE$_{GNSS}$ > gNB OR eNB<br>(FOLLOWING R4-1a or R4-1b) |
| PG1:<br>INC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY | PG1:<br>INC: THE CELL WITH THE FREQUENCY FOR SL:<br>• PCELL/SERVING CELL (IDLE) OR<br>• SCELL/SERVING CELL (IDLE) OR<br>• DL FREQUENCY PAIRED WITH SL FREQUENCY | |
| OOC: PCELL/SERVING CELL OF NR | OOC: PCELL/SERVING CELL OF LTE | |
| PG2: PCELL/SERVING CELL OF LTE | PG2: PCELL/SERVING CELL OF NR | |

*FIG. 12*

| | gNB-BASED SYNCHRONIZATION | eNB-BASED SYNCHRONIZATION | GNSS-BASED SYNCHRONIZATION |
|---|---|---|---|
| | R4-2a:<br>- ORDERED BY PG.<br>- ORDERED BY S-RSRP IN THE SAME PG. | R4-2c:<br>- ORDERED BY PG.<br>- ORDERED BY S-RSRP IN THE SAME PG. | R4-2c:<br>- ORDERED BY PG.<br>- ORDERED BY S-RSRP IN THE SAME PG. |
| PG1 | $NR\_UE_{gNB}$ | $LTE\_UE_{eNB}$ | RELIABLE GNSS |
| PG2 | $NR\_UE_{NR\_UE-gNB}$ | $NR\_UE_{NR\_UE-eNB}$<br>$NR\_UE_{LTE\_UE-eNB}$<br>$LTE\_UE_{LTE\_UE-eNB}$ | $NR\_UE_{GNSS}$<br>$LTE\_UE_{GNSS}$<br>$NR\_UE_{gNB}$<br>$NR\_UE_{eNB}$<br>$LTE\_UE_{eNB}$ |
| PG3 | RELIABLE GNSS | RELIABLE GNSS | $LTE\_UR_{LTE\_UE-GNSS}$<br>$NR\_UE_{LTE\_UE-GNSS}$<br>$NR\_UE_{NR\_UE-GNSS}$<br>$NR\_UE_{NR\_UE-eNB}$<br>$NR\_UE_{LTE\_UE-eNB}$<br>$LTE\_UE_{LTE\_UE-eNB}$<br>$NR\_UE_{NR\_UE-gNB}$ |
| PG4 | $NR\_UE_{GNSS}$<br>$LTE\_UE_{GNSS}$ | $NR\_UE_{GNSS}$<br>$LTE\_UE_{GNSS}$ | $NR\_UE_{OTHER}$<br>$LTE\_UE_{OTHER}$ |
| PG5 | $LTE\_UE_{LTE\_UE-GNSS}$<br>$NR\_UE_{LTE\_UE-GNSS}$<br>$NR\_UE_{NR\_UE-GNSS}$ | $LTE\_UE_{LTE\_UE-GNSS}$<br>$NR\_UE_{LTE\_UE-GNSS}$<br>$NR\_UE_{NR\_UE-GNSS}$ | |
| PG6 | $NR\_UE_{OTHER}$<br>$LTE\_UE_{OTHER}$ | $NR\_UE_{OTHER}$<br>$LTE\_UE_{OTHER}$ | |

ADVANCED V2X COMMUNICATION MECHANISM

INCORPORATION BY REFERENCE

This present disclosure claims the benefit of International Application No. PCT/CN2018/108378, "Advanced V2X Communication Mechanism" filed on Sep. 28, 2018, and No. PCT/CN2018/108377, "UE Capability Dependent Sync Priority Determination Mechanism for V2X communication" filed on Sep. 28, 2018, which are incorporated herein by reference in their entirety.

TECHNICAL FIELD

The present disclosure relates to wireless communications, and specifically relates to sidelink communications for vehicular applications and enhancements to cellular infrastructure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X) (e.g., LTE V2X or NR V2X) is a radio access technology developed by 3GPP to support advanced vehicular applications. In V2X, a direct radio link (referred to as a sidelink) can be established between two vehicles. The sidelink can operate under the control of a cellular system (e.g., radio resource allocation) when the vehicles are within the coverage of the cellular system. Or, the sidelink can operate independently when no cellular system is present.

SUMMARY

Aspects of the disclosure provide a method for sidelink data retransmission. The method can include receiving a first negative acknowledgement (NACK) at a base station (BS) from a receiver user equipment (Rx UE). The NACK corresponds to an original transmission of sidelink data over a sidelink from a transmitter user equipment (Tx UE). The method can further include selecting one or both of the BS and the Tx UE to perform a first retransmission of the sidelink data to the Rx UE.

In an embodiment, when the BS is selected to perform the first retransmission of the sidelink data to the Rx UE, the sidelink data can be transmitted to the Rx UE from the BS. When the Tx UE is selected to perform the first retransmission of the sidelink data to the Rx UE, a first sidelink grant can be transmitted from the BS to the Tx UE for the first retransmission of the sidelink data to the Rx UE.

In an example, the selecting one or both of the BS and Tx UE can be based on whether the BS has received the sidelink data of the original transmission. In an example, the method can further include executing power control to the Rx UE such that the BS is able to receive the NACK from the Rx UE. In an example, the selecting one or both of the BS and Tx UE is based on channel conditions of the sidelink between the Tx UE and the Rx UE, and a Uu link between the Rx UE and the BS, determined at the Rx UE.

In an embodiment, the method can further include receiving a second NACK from the Rx UE corresponding to the first retransmission of the sidelink data to the Rx UE from the Tx UE, and selecting the BS to perform a second retransmission of the sidelink data to the Rx UE. In an example, the method can further include receiving the sidelink data of the original transmission from the Tx UE at the BS, receiving the sidelink data of the first retransmission from the Tx UE at the BS, and performing soft combining of the sidelink data of the original transmission and the first retransmission at the BS.

In an embodiment, the method can further include transmitting from the BS a second sidelink grant included in a downlink control information (DCI) having a cyclic redundancy check (CRC) scrambled with a common identifier know to both the Tx UE and the Rx UE. The second sidelink grant indicates radio resources over the sidelink for the original transmission of the sidelink data. In an example, a number of time and frequency resources for transmitting the second sidelink grant is determined based on a worse one of channel conditions of a first Uu link between the Tx UE and the BS and a second Uu link between the Rx UE and the BS.

Aspects of the disclosure provide a method for sidelink data transmission. The method can include receiving a sidelink grant from a BS at a Rx UE indicating radio resources for transmission of sidelink data over a sidelink from a Tx UE to the Rx UE, and detecting at the Rx UE the sidelink data transmitted over the sidelink at the radio resources indicated by the sidelink grant received from the BS.

Aspects of the disclosure provide a BS. The BS can include circuitry configured to receive a first NACK at the BS from a Rx UE, the NACK corresponding to an original transmission of sidelink data over a sidelink from a Tx UE, and select one or both of the BS and the Tx UE to perform a first retransmission of the sidelink data to the Rx UE. When the BS is selected to perform the first retransmission of the sidelink data to the Rx UE, the sidelink data can be transmitted to the Rx UE from the BS. When the Tx UE is selected to perform the first retransmission of the sidelink data to the Rx UE, a first sidelink grant can be transmitted from the BS to the Tx UE for the first retransmission of the sidelink data to the Rx UE.

Aspects of the disclosure provide a method of sidelink synchronization. The method can include selecting at a UE a timing reference with a highest priority among available sidelink synchronization timing references according to a sidelink synchronization source priority rule that includes different types of sidelink synchronization timing references each having a priority, and determining at the UE a transmission timing according to the selected timing reference. When the different types of sidelink synchronization timing references are gNB or eNB based timing references, the different types of sidelink synchronization timing references include the following types of sidelink synchronization timing references listed from high priority to low priority:

P0': gNB or eNB,
P1': UE directly synchronized to gNB or eNB,
P2': UE in directly synchronized to gNB or eNB,
P3': global navigation satellite system (GNSS),
P4': UE directly synchronized to GNSS,
P5': UE indirectly synchronized to GNSS,
P6': remaining UEs.

In an example, when the different types of sidelink synchronization timing references are GNSS-based references, the different types of sidelink synchronization timing references include the following types of sidelink synchronization timing references listed from high priority to low priority:

P0: GNSS,
P1: UE directly synchronized to GNSS,
P2: UE indirectly synchronized to GNSS,
P3: remaining UEs.

In an embodiment, the selecting includes receiving a sidelink synchronization signal (SLSS) carrying information of a slot index. In an example, a number of bits representing the slot index depends on a numerology of the SLSS. In an example, the SLSS includes a sidelink secondary synchronization signal (S-SSS) and a demodulation reference signal (DMRS), and a sequence of the S-SSS, a sequence of the DMRS, or the sequences of the S-SSS and the DMRS in combination, represent the slot index. In an example, information of the slot index and a subframe index is combined as one field and carried in the SLSS.

In an embodiment, the selecting includes receiving a SLSS carrying sidelink synchronization source priority information, wherein the sidelink synchronization source priority information is carried in signals included in the SLSS other than a sidelink physical broadcast channel (PBCH).

In an embodiment, the selecting includes receiving a SLSS carrying sidelink synchronization source priority information in a sidelink PBCH. Bits of the sidelink synchronization source priority information are arranged at input bit positions of a polar encoder when information bits of the sidelink PBCH are encoded with the polar encoder, such that the bits of the sidelink synchronization source priority information can be obtained without fully decoding the sidelink PBCH.

In an embodiment, the method for sidelink synchronization further includes receiving a sidelink identifier (ID) for identifying sidelink unicast, groupcast, or broadcast, and performing a sidelink transmission using the sidelink ID scrambled with a cell ID of a serving cell when the UE is within or out of coverage of the serving cell.

Aspects of the disclosure provide a UE for sidelink synchronization. The UE can include circuitry configure to select a timing reference with a highest priority among available sidelink synchronization timing references according to a sidelink synchronization source priority rule that includes different types of sidelink synchronization timing references each having a priority, and determine a transmission timing according to the selected timing reference. When the different types of sidelink synchronization timing references are gNB or eNB based timing references, the different types of sidelink synchronization timing references include the following types of sidelink synchronization timing references listed from high priority to low priority:

P0': gNB or eNB,
P1': UE directly synchronized to gNB or eNB,
P2': UE in directly synchronized to gNB or eNB,
P3': GNSS,
P4': UE directly synchronized to GNSS,
P5': UE indirectly synchronized to GNSS,
P6': remaining UEs.

Aspects of the disclosure provide a non-transitory computer-readable medium storing a program. The program is executable by a processor to perform the method of sidelink synchronization.

BRIEF DESCRIPTION OF THE DRAWINGS

Various embodiments of this disclosure that are proposed as examples will be described in detail with reference to the following figures, wherein like numerals reference like elements, and wherein:

FIGS. 6-13 show tables of sidelink synchronization source priority rules according to some embodiments of the disclosure;

DETAILED DESCRIPTION OF EMBODIMENTS

Figure 1A:
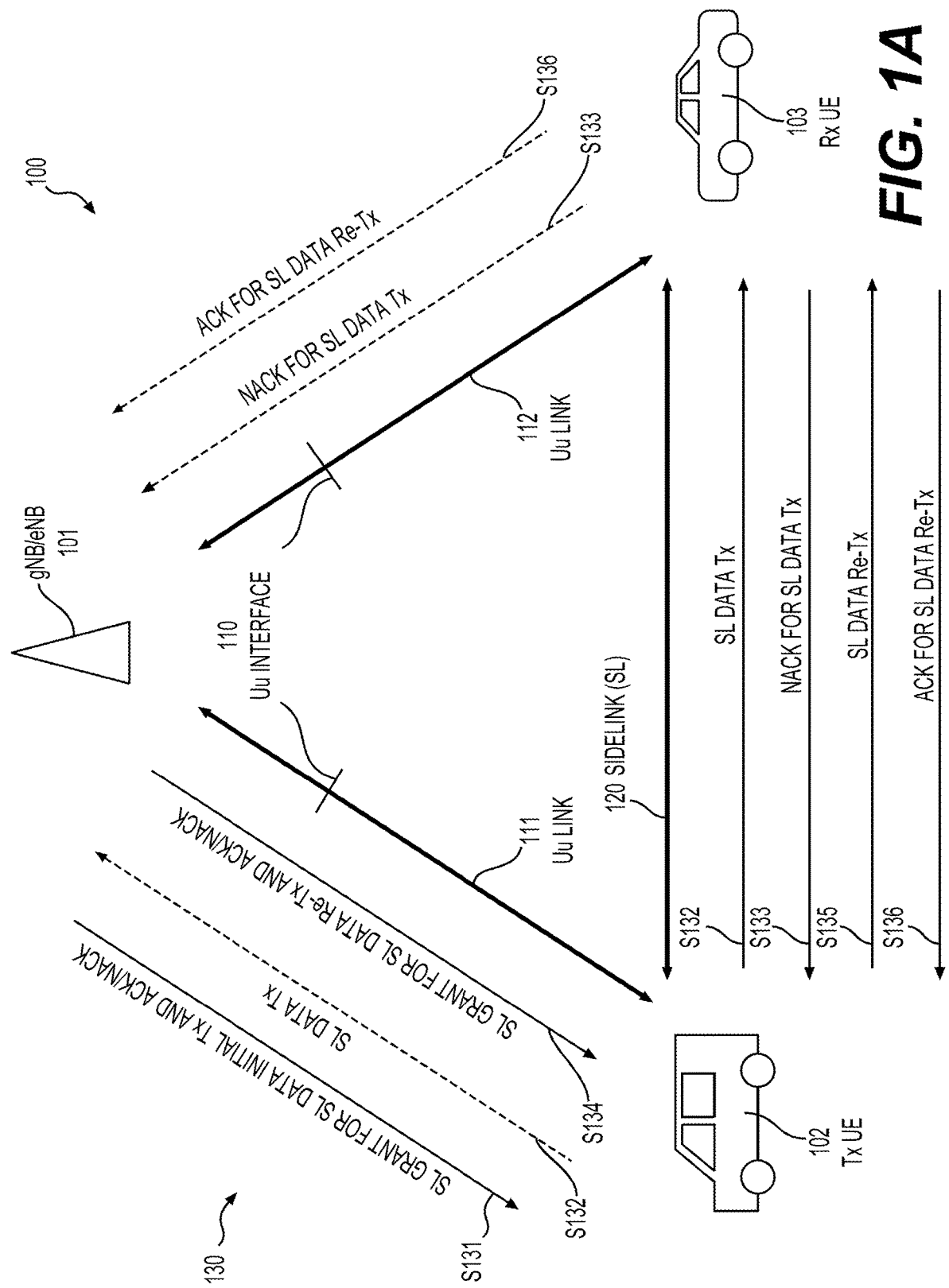
FIG. 1A and FIG. 1B show two data retransmission processes for retransmitting data previously transmitted in a sidelink communication.
Figure 1B:
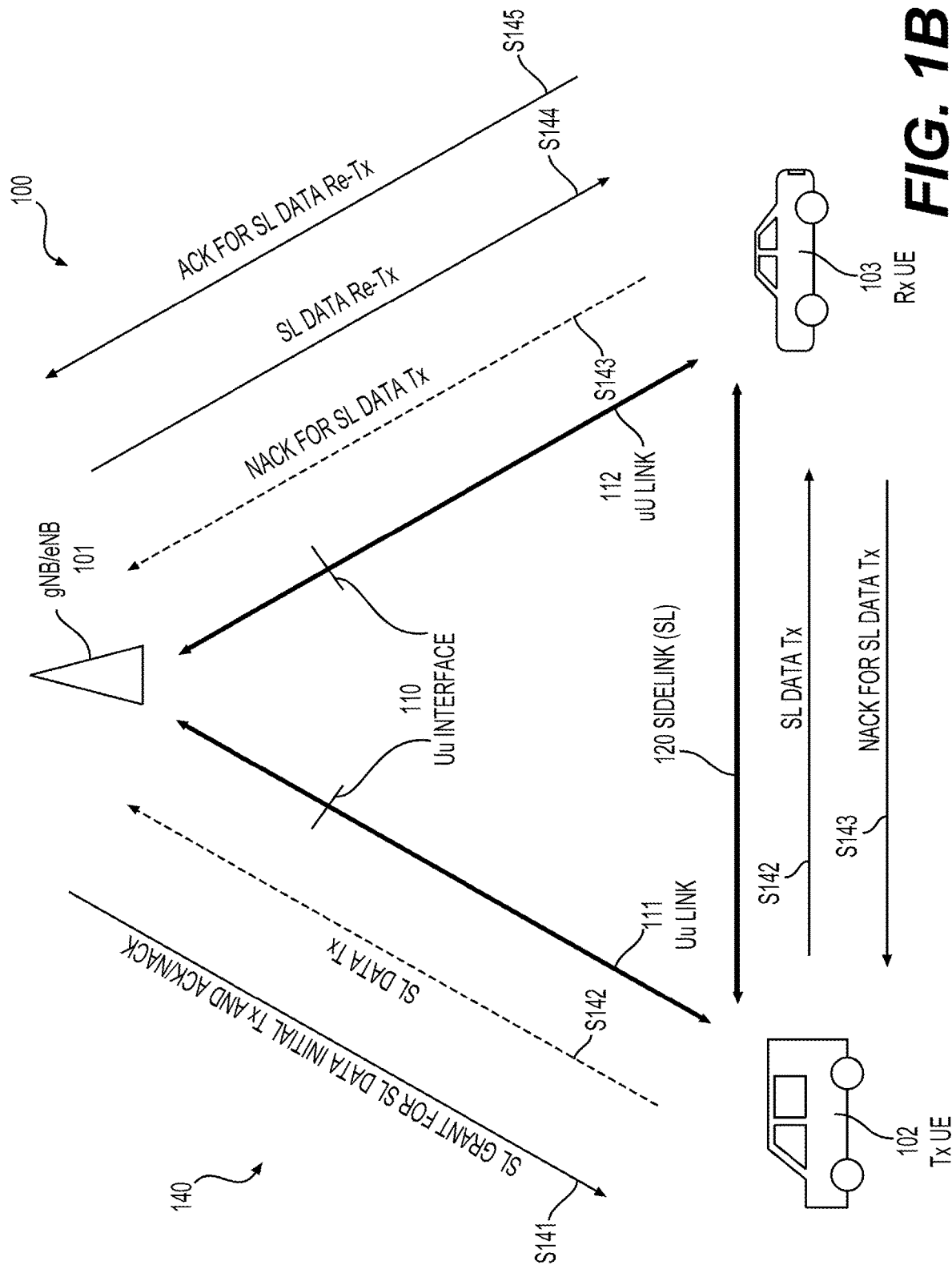

FIG. 1A and FIG. 1B show two data retransmission processes 130 and 140 for retransmitting data previously transmitted in a sidelink communication. One of those two data retransmission processes 130 and 140 can be adaptively selected for data retransmission, for example, depending on channel conditions.

FIG. 1A shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. Alternatively, the BS 101 may implement other types of standardized or non-standardized radio access technologies, and communicate with the UE 102 or 103 according to the respective radio access technologies. The UE 102 or 103 can be a vehicle, a computer, a mobile phone, and the like.

The UE 102 and UE 103 can communicate with each other based on vehicle-to-everything (V2X) technologies specified in 3GPP standards. A direct radio link 120, referred to as a sidelink (SL), can be established between the UEs 102 and 103. The UE 102 can use a same frequency for uplink transmissions over a Uu link 111 and SL transmissions over the SL 120. Similarly, the UE 103 can use a same frequency for uplink transmissions over a Uu link 112 and SL transmissions over the SL 120. In addition, allocation of radio resources over the SL 120 can be controlled by the BS 101.

In an embodiment, the system 100 implements a hybrid automatic repeat request (HARQ) scheme for data retransmission. A first HARQ data retransmission process 130 of this HARQ scheme is illustrated in FIG. 1A. The process 130 can include steps from S131 to S136. During the process 130, the UE 102 transmits SL data, while the UE 103 receives the SL data. Accordingly, the UE 102 is referred to as a transmitter UE (Tx UE) while the UE 103 is referred to as a receiver UE (Rx UE).

At S131, a first SL grant is transmitted from the BS 101 to the Tx UE 102 over the Uu link 111. The first SL grant may indicate radio resources for the data transmission from the Tx UE 102 to the Rx UE 103. The first SL grant may further indicate radio resources for positive or negative acknowledgement (ACK/NACK) feedback from the Rx UE 103 to the Tx UE 102. Alternatively, the radio resources for ACK/NACK can be determined based on the radio resources allocated for the data transmission. For example, by configuration, the frequency and time domain location of the radio resources for ACK/NACK feedback can be determined based on that for the data transmission. In an example, the transmission of the first SL grant is performed as a response to receive a scheduling request from the Tx UE 102.

At S132, the SL data is transmitted from the Tx UE 102 to the Rx UE 103 over the SL 120 based on the first SL grant received at S131. For example, using the radio resource indicated by the first SL grant, the Tx UE 102 may transmit a physical SL control channel (PSCCH) followed by a physical SL share channel (PSSCH) over the SL 120. The PSCCH carries information scheduling the PSSCH. The Rx UE 103 can detect the PSSCH based on the scheduling information carried in the PSCCH.

The signal for transmitting the SL data can be a broadcast signal, or a beamformed signal, towards both the Rx UE 103 and the BS 101 over the channel shared between the uplink of the Uu link 111 and the SL 120. In addition, the allocation of the radio resource for the SL data transmission is provided by the BS 101, and thus is known to the BS 101. If the BS 101 executes proper power control over the Tx UE 102, and a channel condition over the shared wireless channel is good enough, the BS 101 can detect and decode the SL data transmitted from the Tx UE 102.

At S133, the reception of the transmitted SL data is failed at the Rx UE 103, and a NACK is transmitted from the Rx UE 103 over the SL 120. Similarly, the signal for the transmission of the NACK can be detected by both the Tx UE 102 and the BS 101. Alternatively, the signal for the transmission of the NACK is detected by at least the BS 101 in other examples. For example, due to poor channel condition of the SL 120, the Rx UE 102 may not detect the NACK feedback.

At S134, a second SL grant for retransmission of the SL data is transmitted from the BS 101 to the Rx UE 102 over the Uu link 111. For example, in response to receiving the NACK for the SL data transmission from the Rx UE 103, the BS 101 can determine to transmit the second SL grant. Similarly, radio resources for ACK/NACK feedback can be indicated by or derived from the second SL grand.

At S135, the SL data is retransmitted from the Tx UE 102 to the Rx UE 103 based on the second SL grant over the SL 120. In alternative examples, the first SL grant may specify radio resources for the retransmission of the SL data. Under such a configuration, the Tx UE 102 may retransmit the SL data if the Tx UE 102 receives the NACK feedback over the SL 120. Accordingly, S134 may be skipped in those examples.

At S136, when the detection of the SL data is successful at the Rx UE 103, an ACK for the data retransmission can be fed back to the Tx UE 102 over the SL 120. Similarly, the signal for the ACK transmission may also reach the BS 101. The first HARQ data retransmission process 130 can be completed after S136.

FIG. 1B shows the same wireless communication system 100 as in FIG. 1A. The system 100 still implements the HARQ data retransmission scheme. However, a second HARQ data retransmission process 140 of the HARQ data retransmission scheme takes place in the system 100. Different from the first process 130 in FIG. 1A where the Tx UE 102 performs the SL data retransmission, in the second process 140, the SL data retransmission is performed by the BS 101. Specifically, the second process 140 can include steps from S141 to S145.

The steps of S141 to S143 can be similarly performed as in the steps of S131 to S133. However, different from the first process 130, at S144, the BS 101 may determine to use the BS 101 to perform the SL data retransmission instead of the Tx UE 102. For example, instead of sending the second SL grant to trigger the Tx UE 102 to perform the SL data retransmission over the SL 120, the BS 101 may transmit the SL data (that is previously received at S142) via the Uu link 112. For example, the BS 101 may transmit downlink control information (DCI) on a physical downlink control channel (PDCCH) that schedules a physical downlink shared channel (PDSCH) carrying the SL data. The Rx UE 103 may detect the DCI and subsequently detect and decode the SL data.

At S145, when the detection is successful, the Rx UE 103 may transmit an ACK for the SL data retransmission over the Uu link 112 as a response to the SL data retransmission over the Uu interface 110 at S144. For example, the ACK information may be carried on a physical HARQ indicator channel (PHICH) or a physical uplink shared channel (PUSCH). Those radio resources of the PHICH or the PUSCH can be indicated by or derived according to the DCI received at S144.

Under such a configuration, the Tx UE 102 may not detect the ACK transmitted over the Uu interface 110. In an example, the Tx UE 102 may receive a new SL grant from the BS 101 carrying a new data indicator. In response to receiving the latest SL grant carrying the new data indicator, the Tx UE 102 may understand the SL data has been transmitted successfully, and accordingly release the SL data from a buffer.

The second HARQ data retransmission process 140 can be completed after S145.

According to an aspect of the disclosure, by implementing the HARQ data retransmission scheme, the BS 101 can adaptively select the BS 101 or the Tx UE 102, or both, to perform HARQ retransmission for unicast or groupcast communications over the SL 120. For example, depending on a decision of the BS 101, one of the processes 130 or 140 can be performed. The decision of selecting one or both of the BS 101 or the Tx UE 102 to perform the HARQ retransmission can depend on the flowing considerations.

In an embodiment, the selection of one or both of the BS 101 and the Tx UE 102 for the SL data retransmission can first be based on whether the SL data is received (e.g., successfully decoded) at S132 or S142, and whether the NACK is received (e.g., successfully decoded) at S133 or S143. For example, due to poor channel conditions, the BS 101 may not receive the SL data or the NACK. When the SL data is not received, the BS 101 can select the Tx UE 102 to perform the SL data retransmission. When the SL data is received but the NACK is not received, the BS 101 may not perform retransmission operations either from the BS 101 or the Tx UE 102. Alternatively, the BS 101 may be configured to blindly perform a retransmission via either the BS 101 or the Tx UE 102, or both, when the ACK or NACK is not received at a scheduled time.

In an embodiment, in order to receive the SL data and the ACK/NACK at the BS 101, the BS 101 can be configured to execute power control for transmissions by the Tx UE 102 and the Rx UE 103. For example, the power control to the Tx UE 102 can be based on a path loss of the worse one between the Uu link 111 and the SL 120, and capped by a maximum allowed power level applied to the Uu link 111. For example, the Rx UE 103 can perform measurement periodically for signals received from the Tx UE 102 over the SL 120, and report measurement results to the BS 101. The BS 101 may obtain measurement results of signals received from the Tx UE 102. Based on those measurement results, the BS 101 can have knowledge of the path loss over the Uu link 111 (uplink direction) and the SL 120 (for transmissions from the Tx UE 102). The BS 101 can accordingly transmit a DCI indicating a power adjustment to the Tx UE 102 to control transmission power of the Tx UE 102.

To avoid interference over the Uu interface 110, the Tx UE 102 may increase the transmission power with a restriction of the maximum allowed power level for the Uu link 111. In an embodiment, the maximum allowed power level configured for the Uu link 111 is signaled from the BS 101 to the Tx UE 102.

In an embodiment, the BS 101 can be configured to separately execute power control to the SL 120 and the Uu link 111. For example, different DCIs with different radio network temporary identifiers (RNTIs) can be transmitted from the BS 101 to the Tx UE 102. The different RNTIs can be used to differentiate the different DCIs that carry different power adjustments applicable to transmissions over the SD link 120 or the Uu link 111. Similarly, the transmission power over the SL 120 can be capped by the maximum allowed power level configured for the Uu link 111.

In an embodiment, the selection of one or both of the BS 101 and the Tx UE 102 for the SL data retransmission can further be based on channel conditions in the SL 120 and the Uu links 111 or 112. For example, the channel conditions can include channel state information (CSI) and path loss in the SL 120 and the Uu links 111 or 112. For example, the BS 101 can obtain the channel conditions of the SL 120 and the Uu link 112 by receiving a report from the Rx UE 103 that performs a related measurement process. In an example, when a channel quality of the SL 120 (from the Tx UE 102 to the Rx UE 102) indicated by the channel conditions is better than a channel quality of the Uu link 112 (downlink direction), the BS 101 may select the Tx UE 102 for the SL data retransmission. Otherwise, the BS 101 may select the BS 101 itself for the SL data retransmission.

In an example, the BS 101 can compare the channel conditions of the SL 120 and the Uu link 112 with a threshold, or separate thresholds. When the channel quality of the SL 120 or the Uu link 112 is above the respective threshold, one or both of the SL 120 and the Uu link 112 can be selected for the SL data retransmission.

In an embodiment, the selection of the BS 101 or the Tx UE 102 for the SL data retransmission can be based on a reliability or QoS requirement associated with each of different types of SL data. For example, given certain channel conditions of the SD link 120 and the Uu links 111 or 112, the BS 101 may make different selections depending on the types of the SL data, for example, to satisfy the reliability or QoS requirements of certain types of DL data.

In an embodiment, the selection of the BS 101 or the Tx UE 102 for the SL data retransmission can be performed in the following way. The BS 101 may first select the Tx UE 102 to perform the SL data retransmission. When reception of the retransmitted SL data is failed for a second time (e.g., the BS 101 receives a NACK from the Rx UE 103 for a second time), the BS 101 may determine to perform a next SL data retransmission using the BS 101.

Under such a configuration, the BS 101 may be configured with a soft combining buffer for storage of SL data received from the Tx UE 102 in the successive occasions (the original transmission and the retransmission of the Tx UE 102). Those two pieces of SL data can be soft combined (e.g., with a chase combining or incremental redundancy scheme) and decoded, and subsequently used for the next SL data retransmission from the BS 101.

In an embodiment, the SL grant (e.g., transmitted at S132, S134, or S142 in the process 130 or 140) can be received by both the Tx UE 102 and the Rx UE 103. For example, the Uu links 111 and 112 operate on a same frequency layer (e.g., a same cell). The SL grant can be carried in a DCI having a cyclic redundancy check (CRC) scrambled with a common identifier (ID) assigned to both the Tx UE 102 and the Rx UE 103. For example, the common ID can be an RNTI or a physical layer ID known to both the Tx UE 102 and the Rx UE 103. Thus, when the DCI is transmitted in the downlink direction over the Uu interface 110, both the Tx UE 102 and the Rx UE 103 can detect the DCI to obtain the DL grant. In this way, both the Tx UE 102 and the Rx UE 103 can know the radio resources granted for transmission of the SL data over the SL 120. Transmission of the PSCCH (that schedules the PSSCH) over the SD link 120 as performed in S132, S135, or S142 can be omitted to save radio resources and reduce SL data transmission complexity.

In one example, the BS 101 determines a number of time and frequency resources for the SL grant based on the worse one between the Uu link 111 and the Uu link 112, such that both the Tx UE 102 and Rx UE 103 can receive the SL grant. For example, the one of the Uu links 111 and 112 having a worse channel condition (e.g., CSI, pathloss) is used to determine a the number of time and frequency resources for transmitting the SL grant provided by the BS 101 to both Tx UE 102 and the Rx UE 103.

In an embodiment, two different methods can be used for the Rx UE 103 transmitting the ACK/NACK feedback over the SL 120 for reception the DL data from the Tx UE 102. The first method is to transmit the ACK/NACK feedback using the radio resources configured by or derived from the SL grant, for example, in a form of a physical SL HARQ indicator channel. The second method is to attach the ACK/NACK feedback to a PSSCH transmitted from the Rx UE 103 to the Tx UE 102. For example, when the Rx UE 103 has SL data to be transmitted to the Tx UE 102, a PSSCH can be transmitted over the SL 120 from the Rx UE 103 to the Tx UE 103. The HARQ feedback information can be included in the PSSCH.

In an embodiment, when there is SL data stored in a buffer waiting to be transmitted to the Tx UE 102, the Rx UE 103 transmits a PSSCH that carries SL scheduling request related information to the Tx UE 102. The SL scheduling request related information can include a SL scheduling request, buffer status information (indicating SL data in a buffer at the Rx UE 103), and/or traffic type (e.g., unicast, groupcast, or broadcast). In an embodiment, instead of carrying the SL scheduling request related information in a PSSCH, the Rx UE 103 may include the SL scheduling request related information in a media access control (MAC) control element (CE) of a transport block carried in a PSSCH.

In an embodiment, at the Tx UE 102, the Tx UE 102 can transmit a PSSCH to the Rx UE 103 that includes radio resource allocation information for SL date transmission and/or reception between the Tx UE 102 and the Rx UE 103. In an example, the transmission of the radio resource allocation information can be a response to and based on SL scheduling related information (e.g., a scheduling request, buffer status, and/or traffic type) received from the Rx UE 103.

For example, the radio resource allocation information may include a radio resource configuration for the SL data transmission and/or reception between the Tx UE 102 and Rx UE 103 during a period. For example, the configuration can specify a sequence of periodical transmission occasions over the period. Alternatively, the radio resource allocation information may indicate radio resources for the transmission and/or reception between the Tx UE 102 and Rx UE 103 in a next time unit (e.g., a slot). Based on the radio resource allocation information carried in the PSSCH, the Tx UE 102 and Rx UE 103 can have a mutual understanding of when the respective transmissions and receptions will take place between the Tx UE 102 and Rx UE 103. Collisions of SL data transmission of two opposite directions over the SL 120 can thus be avoided.

In an example, the above scheme of carrying radio resource allocation information over a PSSCH can be applied to UEs forming a cluster. The cluster may include a master UE that transmits radio resource allocation information over a PSSCH to other member UEs of the cluster. In an example, the master UE is selected by a BS. In other examples, the master UE can be determined without a BS.

In various embodiments, the above described examples of carrying radio resource allocation information over a PSSCH, carrying a SL scheduling request over a PSSCH or a MAC CE, or carrying ACK/NACK information over a PSSCH, can be performed by UEs within a coverage of a BS or out of a coverage of a BS. For example, when a UE is out of coverage of a BS, the UE can determine SL radio resource allocation without control of the BS. When a UE is within the coverage of a BS, SL radio resource allocation may or may not be controlled by the BS.

Figure 2:
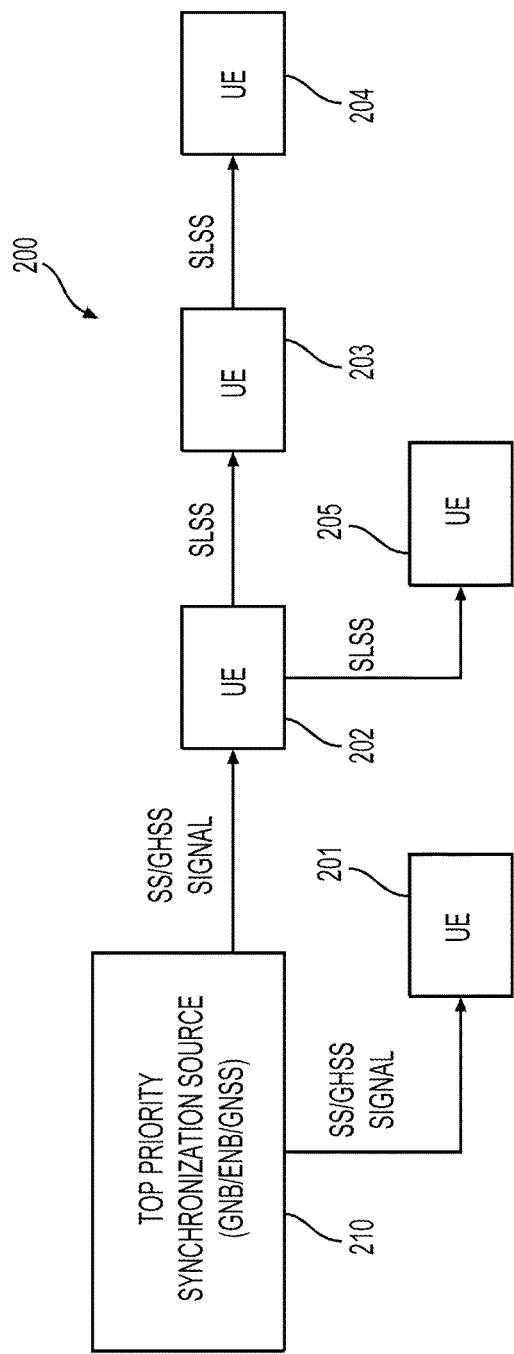
FIG. 2 shows a cluster of UEs with a base station present according to an embodiment of the disclosure.

FIG. 2 shows a cluster 200 of UEs 201-205 according to an embodiment of the disclosure. Each UE 201-205 synchronizes to a nearby synchronization source and accordingly determines a transmission timing or a reception timing for sidelink communications (e.g., unicast, groupcast, or broadcast) with nearby UEs within the cluster 200. A synchronization source 210 (e.g., a gNB, an eNB, or a global navigation satellite system (GNSS)) (or a synchronization signal (SS) from the synchronization source 210) is used as a top priority timing reference which is extended to the UEs 201-205 within the cluster 200.

For example, the UEs 201-202 are within the coverage of the synchronization source 210, and accordingly can directly synchronize to the synchronization source 210. For example, a gNB or eNB may periodically transmit LTE or NR synchronization signals (SSs) such as primary synchronization signal (PSS), secondary synchronization signal (SSS), and physical broadcast channel (PBCH) signal. GNSS satellites may continuously transmit navigation signals. Using those signals as timing references, the UEs 201-202 can obtain the reference timing, and accordingly determine the transmission or reception timing of itself.

After being synchronized to the synchronization source 210, the UE 202 can transmit a sidelink synchronization signal (SLSS) that is synchronized to the synchronization source 210. The SLSS can include a sidelink primary synchronization signal (S-PSS), a sidelink secondary synchronization signal (S-SSS), and a sidelink physical broadcast channel (S-PBCH, or PSBCH) signal, and can be transmitted periodically. In an example, when the UE 202 starts to transmit the SLSS can be controlled by a gNB or an eNB which the UE 202 is connected to or camped on. In an example, the UE 202 itself can make a decision when to transmit the SLSS. For example, the UE 202 can determine to transmit the SLSS when a quality (e.g., indicated by reference signal received power (RSRP)) of a signal from the gNB or the eNB is below a threshold.

By receiving the SLSS from the UE 202 as a timing reference, the UEs 203 and 205, which are out of the coverage of the top priority timing reference 210, can synchronize to the UE 202, and becomes indirectly synchronized to the top priority synchronization source 210.

Similarly, the UE 203 can transmit a SLSS that is synchronized to the timing reference of the UE 202. By using the SLSS of the UE 203 as a timing reference, the UE 204 can by synchronized to the UE 203.

Figure 3:
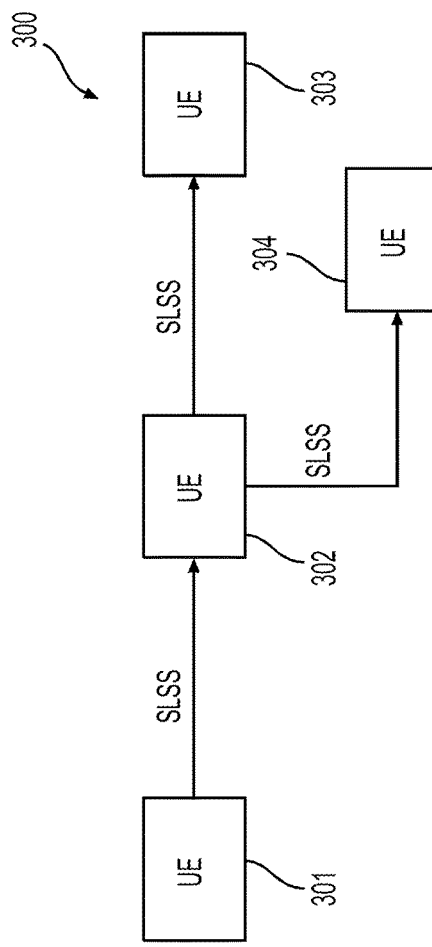
FIG. 3 shows another cluster of UEs without presence of a base station according to an embodiment of the disclosure.

FIG. 3 shows another cluster 300 of UEs 301-304 according to an embodiment of the disclosure. Each UE 301-304 synchronizes to a nearby synchronization source in order to determine a transmission timing or a reception timing for sidelink communications (e.g., unicast, groupcast, or broadcast) with nearby UEs within the cluster 300. In the cluster 300, none of the UEs 301-304 is within the coverage of a synchronization source (e.g., the synchronization source 210 in the FIG. 2 example). For example, when the UE 301 is powered on or has lost synchronization to other synchronization sources (e.g., a gNB, an eNB, a GNSS, or a UE), the UE 301 tries to search for a synchronization source (e.g., a gNB, an eNB, a GNSS, or a UE) and is not successful. Accordingly, the UE 301 may autonomously determine a transmission timing, and transmit a SLSS based on this transmission timing. The UE 302 can use the SLSS from the UE 301 as a timing reference and determine a transmission timing of the UE 302. In a similar way, the UEs 303-304 can perform synchronization based on a SLSS transmitted from the UE 302.

According to an aspect of the disclosure, in order to facilitate synchronization operations in sidelink communications, a synchronization rule can be specified. According to the synchronization rule, different timing references (or synchronization sources) can be categorized into different groups or types. Each type of the timing references is given a priority. A synchronization configuration indicating the synchronization rule can be configured to a UE. Based on this synchronization configuration, the UE can select a timing reference with the highest priority among available timing references to synchronize with.

In an embodiment, the synchronization configuration can be configured to the UE through radio resource control (RRC) signaling or broadcasted system information when the UE is in coverage of a BS. The UE can store the synchronization configuration locally, and use the synchronization configuration when being in an in-coverage status (connected to a BS in RRC connected mode or camping on a BS in RRC idle mode), or in an out-of-coverage status. Alternatively, the synchronization configuration can be configured to the UE, for example, by storage in a subscriber identity module (SIM) or in a non-volatile memory of the UE. For example, when the UE is out of coverage, and has not received a synchronization configuration from a BS before, the UE can use the locally stored synchronization configurations to select a timing reference. After the UE receives the synchronization configuration from the BS, the UE can use the received synchronization configuration. In an example, the UE can use the locally stored synchronization configuration when the UE is in coverage or out of coverage of a BS.

Figure 4:
FIG. 4 shows an example of a gNB/eNB-based synchronization rule according to an embodiment of the disclosure.

FIG. 4 shows an example of a gNB/eNB-based synchronization rule 400 according to an embodiment of the disclosure. The gNB/eNB-based synchronization rule 400 includes 7 types of timing references with priorities from P0' to P6'. The 7 types of timing references are listed in priority decreasing order.

In an example, a current UE configured (e.g., by signaling or by storage at the UE) with the rule 400 can perform a synchronization procedure in the following way. As the gNB or eNB is configured to be the top priority timing reference, the current UE can first search for a SS from a gNB or eNB, for example, after powered on or losing synchronization. If a SS from a gNB or eNB with a signal quality above a threshold is found, the current UE can synchronize to the SS. In an example, when both a gNB and an eNB are found, the one of the respective SSs with a higher signal quality (e.g., RSRP) is used as the timing reference.

Using a gNB or an eNB as a top priority timing reference, UEs within a coverage of a gNB or eNB can be synchronized to a same BS (or a same cell). As a result, sidelink transmissions among the UEs will take place within intended time-frequency resources, thereby reducing uncontrolled interference to other sidelink and non-sidelink (cellular uplink) transmissions in a same band.

When no suitable SS from a gNB or eNB is found, the current UE can continue to search for a SLSS from a UE directly synchronized to a gNB or an eNB. For example, in the FIG. 2 example, assuming the synchronization source 210 is a gNB, the UE 205 at the current location can receive SLSSs from both the UE 202 and the UE 203. Based on the received SLSSs, the UE 205 can know the UE 202 is a UE directly synchronized to the gNB (the synchronization source 20), while the UE 203 is a UE indirectly synchronized to the gNB. According to the synchronization rule 400, the UE 205 can select the UE 202 as a timing reference, as the UE 202 has a priority of P1' while the UE 203 has a priority of P2' as specified in the rule 400.

When a timing reference is extended through a chain of UEs, timing errors can accumulate with respect to the original synchronization source. For example, the UE 202 (that is a hop 0 timing reference (e.g, direct synchronization)) has a higher timing accuracy than the UE 203 (that is a hop 1 timing reference (e.g, indirect synchronization)). Accordingly, the UE 205 can obtain a transmission or reception timing with a higher accuracy from the UE 202 than from the UE 203.

In an embodiment, information of a number of hops of a UE with respect to a top priority synchronization source can be carried in a SLSS of the respective UE. The current UE can accordingly select the one with the fewest hops among available UEs (e.g., UE indirectly synchronized to a gNB or an eNB) as a sidelink synchronization source.

When no UE indirectly synchronized to a gNB or an eNB is found, according to the synchronization rule 400, the current UE can search for navigation signals of a GNSS (with a priority of P3'). If no GNSS is available, the current UE can search for a UE directly synchronized to a GNSS (a UE with a priority of P4') to synchronize with. If no UE directly synchronized to a GNSS is available, the current UE may search for a UE indirectly synchronized to a GNSS (a UE with a priority of P5'). If no UE indirectly synchronized to a GNSS is found, the current UE may determine to use one of other available UEs as a timing reference (a UE with a priority of P6'). For example, those other available UEs can belong to a cluster of UEs where no gNB, eNB, or GNSS is present, such as the UEs 301-304 in the FIG. 3 example.

When no UEs are available around the current UE, the current UE can autonomously determine a transmission timing and accordingly transmit a SLSS. Please note that according to different designs, the orders can be different from the embodiment shown in FIG. 4.

In some embodiments, when the synchronization source priority rule 400 is configured to a UE (e.g., by signaling or by storage in a SIM), the UE may perform a sidelink synchronization according to the rule 400, however, with consideration of UE capability restriction.

For example, a NR UE is able to receive a SS from a NR BS (e.g., gNB), but may not be able to receive a SS from an LTE BS (e.g., eNB). In contrast, an LTE UE is able to receive SS from an LTE BS but may not be able to receive SS from a NR BS.

For example, a NR V2X UE has the ability to perform sidelink communications according to protocols specified by a NR V2X standard, and accordingly can perform synchronization using a SLSS compliant with the NR V2X standard. Accordingly, the NR V2X UE can receive a SLSS from an LTE UE or NR UE that operates according to the NR V2X standard. However, the NR V2X UE may not use a SLSS from a UE operating according to the LTE V2X standard.

Similarly, an LTE V2X has the ability to perform sidelink communications according to protocols specified by the LTE V2X standard, and accordingly can perform synchronization using a SLSS compliant with an LTE V2X standard, but may not perform synchronization suing a SLSS of the NR V2X standard.

Because of different UE capabilities, available synchronization sources for different UEs can be different when a same set of synchronization sources is present. Accordingly, in an embodiment, a UE configured with the synchronization source priority rule 400 can derive a synchronization source priority configuration or rule according to the rule 400 based on a capability of the UE. For example, some kinds of synchronization sources unusable for the UE may not be included in the derived rule or configuration.

In an embodiment, instead configure the rule 400 to a UE, a synchronization source priority configuration or rule can first be derived based on the rule 400 and a capability of the UE, and subsequently configured to the UE (e.g., by signaling or by storage at the UE).

Figure 5:
FIG. 5 shows a GNSS-based synchronization rule according to an embodiment of the disclosure.

FIG. 5 shows a GNSS-based synchronization rule 500 according to an embodiment of the disclosure. In the GNSS-based synchronization rule 500, timing references are categorized into 4 groups or types each with a priority. The 4 types of timing references are listed in priority decreasing order from P0 to P3. Different from the rule 400, the rule 500 includes the GNSS as a top priority synchronization source. Different network operators may prefer different network deployment strategies and thus may choose the GNSS or the gNB and/or eNB as the top priority sidelink synchronization source. When the GNSS is preferred, the rule 500 can be used.

FIGS. 6-13 show tables 600-1300 of sidelink synchronization source priority rules according to some embodiments of the disclosure. Those priority rules can be configured to a UE (e.g., by RRC or system information signaling, or storage in a SIM module (e.g, a universal integrated circuit card (UICC) module or a memory), and used as a basis for selecting a timing reference.

Each table can include 2 or 3 gNB-based, eNB-based, or GNSS-based priority rules. For example, depending on network operator's deployment preference, the gNB-based, eNB-based, or GNSS-based priority rules can be configured to a UE and used as a basis for selecting a timing reference.

In some priority rules (e.g., R1-2$a$, R1-2$b$ in the table 700), different types of synchronization sources are organized into different priority groups (e.g., PG1, PG2, and the like). For each such priority rule, the priority groups are listed from high priority to low priority (e.g., from PG1 to PG6 in R1-2a).

In addition, in an example, within a same priority group, when multiple synchronization sources are available, the one with a higher signal quality (e.g., measured by sidelink RSRP (S-RSRP)) can be selected.

Different priority rules can be configured to UEs having different capabilities. For example, the rules in the tables 600-700 can be used by a NR only and NR V2X only UE. The rules in the tables 800-900 can be used by a NR/LTE (NR and LTE capable) and NR V2X only UE. The rules in the tables 1000-1100 can be used by a NR only and NR V2X/LTE V2X UE. The rules in the tables 1200-1300 can be used by a NR/LTE and NR V2X/LTE V2X UE. The invention is not limited by these.

For UEs in an in-coverage status (e.g., within a coverage of a gNB, or eNB), or an our-of-coverage status (e.g., not within a coverage of a gNB or eNB), different priority rules can be applied. Accordingly, the priority rules corresponding to the in-coverage and our-of-coverage status are separate into different tables in the examples of the tables 600-1300.

The tables 600 and 700 include priority rules for NR only and NR V2X only UEs in in-coverage status and out-of-coverage status, respectively. The table 600 includes two rules, denoted by R1-1a and R1-1b, that are gNB-based and GNSS-based, respectively. The table 700 includes two rules, R1-2a and R1-2b, that are gNB-based and GNSS-based, respectively.

In the rule R1-1a, when a UE is within a coverage (InC) of a cell that operates with a frequency the same as that of a sidelink of the UE, a PCell or SCell of the UE can be used as the synchronization source when the UE is in RRC connected mode. Or, a serving cell that the UE camps on can be used as the synchronization source when the UE is in RRC idle mode. Or, SSs from a downlink frequency paired with the respective sidelink frequency of the UE can be used as the timing reference. When the UE is out of coverage (OoC) of the cell that operates with a frequency the same as that of a sidelink of the UE, a PCell the UE is connected with or a serving cell the UE camps on can be used as a synchronization source. This PCell or serving cell can operate with a frequency different from that of the sidelink of the UE.

In the rule R1-1b, one of a GNSS, a NR UE directly synchronized to the GNSS, and a gNB can be used as a synchronization source. The GNSS has a highest priority while the gNB has a lowest priority.

In addition, NR_UE$_{GNSS}$ denotes a NR UE synchronized to a GNSS. NR_UE$_{gNB}$ denotes a NR UE synchronized to a gNB. NR_UE$_{NR\_UE-gNB}$ denotes a NR UE synchronized to a NR_UE$_{gNB}$. NR_UE$_{NR\_UE-GNSS}$ denotes a NE UE synchronized to a NR_UE$_{GNSS}$. Meanings of other notations in the tables 600-1300 can be interpreted similarly.

The tables 800 and 900 include priority rules for NR/LTE and NR V2X only UEs in in-coverage status and out-of-coverage status, respectively. Compared with the tables 600 and 700, LTE related synchronization sources (e.g., PCell/Serving cell of LTE, NR-UE$_{NR\_UE-eNB}$, NR_UE$_{LTE\_UE-GNSS}$) are added to the rules.

The tables 1000 and 1100 include priority rules for NR only and NR V2X/LTE V2X UEs in in-overage status and out-of-coverage status, respectively. Compared with the tables 600 and 700, LTE UE related synchronization sources (e.g., LTE_UE$_{GNSS}$, LTE-UE$_{eNB}$, LTE_UE$_{other}$) are added to the rules.

The tables 1200 and 1300 include priority rules for NR/LTE and NR V2X/LTE V2X UEs in in-overage status and out-of-coverage status, respectively. Compared with the tables 600 and 700, LTE and LTE UE related synchronization sources are added to the rules.

As shown in the tables 700/900/1100/1300, the gNB or eNB based rules for out-of-coverage usage, R1-2a (in the table 700), R2-2a and R2-2b (in the table 900), R3-2a and R3-2b (in the table 1100), and R4-2a and R4-2b (in the table 1300), each include 6 priority groups from PG1 to PG6. Similar to the priority types from P1' to P6' listed in the synchronization source priority rule 400 in FIG. 4, the priority group PG1 includes UEs that are directly synchronized to a gNB or an eNB. The priority group PG2 includes UEs that are indirectly synchronized to a gNB or an eNB. The priority group PG3 includes one or more GNSSs. The priority group PG4 includes UEs that are directly synchronized to a GNSS. The priority group PG5 includes UEs that are indirectly synchronized to a GNSS. The priority group PG6 includes other UEs. Please note that in the tables 700/900/1100/1300, priority group PG0 are omitted for brevity. Similar to the priority type P0' listed in the synchronization source priority rule 400 in FIG. 4, the priority group PG0 includes one or more eNB/gNB (to be synchronized by the UE).

As shown in the tables 700/900/1100/1300, the GNSS based rules for out-of-coverage usage, R1-2b, R2-2c, R3-2c, and R4-2c, each include 4 priority groups from PG1 to PG4. Similar to the priority types from P0 to P3 listed in the synchronization source priority rule 500 in FIG. 5, the priority group PG1 includes one or more GNSSs. The priority group PG2 includes UEs directly synchronized to a GNSS. The priority group PG3 includes UEs indirectly synchronized to a GNSS.

In some embodiments, beamforming sweeping is employed in sidelink transmissions. Accordingly, SLSSs in the form of sidelink synchronization signal blocks (S-SSBs) can be transmitted over beams towards different directions during a beam sweeping to cover a cell. The S-SSBs in the beam sweeping can be organized into an S-SSB burst. Each S-SSB can include an S-PSS, an S-SSS, a PSBCH, and a demodulation reference signal multiplexed with the PSBCH (PSBCH DMRS). The S-SSB burst can be transmitted periodically, for example, for every 5 ms, 10 ms, 20 ms, and the like.

In addition, different numerologies may be employed for frequencies used in sidelink transmissions. In an example, a default numerology or a set of numerologies for sidelink transmissions can be preconfigured to a UE (e.g., storage in a SIM module). Accordingly, the UE can search for a SLSS with the default numerology or one of the set of configured numerologies. In an example, one or more numerologies can be signaled from a BS to a UE. Accordingly, the UE can search for a SLSS with the signaled numerologies.

For different numerologies, different subcarrier spacings (e.g., 15 kHz, 30 kHz, 60 kHz, and the like) can be used, and accordingly, different number of slots can be included in a subframe of 1 ms. For example, corresponding to the subcarrier spacings 15 kHz, 30 kHz, 60 kHz, and 120 kHz, each subframe can include 1, 2, 4, and 8 slots, respectively. Under such a configuration, for different numerologies, positions of S-SSBs of an S-SSB burst over a subframe may be arranged differently for different numerologies.

In an embodiment, slot index information of an S-SSB corresponding to a certain numerology is signaled to a UE from a BS, or is carried in the S-SSB, such that the UE can determine which slot (e.g., indicated by a slot index) the respective S-SSB is positioned in. The S-SSB can also carry information of a system frame number (SFN) and subframe index associated with the S-SSB. Based on the information of the slot, subframe, and the SFN, the UE can determine timings of the respective S-SSB.

In an embodiment, number of bits used for indicating the slot index of the S-SSB depends on the numerology of the S-SSB. For example, for the numerology of 120 kHz, there can be 8 slots in a subframe, while for the numerology of 30 kHz, there can be 2 slots in a subframe. Accordingly, a maximum allowed positions for S-SSBs for the numerology of 120 kHz can be more than that for the numerology of 30 kHz. Thus, more bits are potentially needed for representing the slot indices for the numerology of 120 kHz that for the numerology of 30 kHz. In an example, 1 bit, 2 bits, and 4 bits are used for indicating slot indices for the numerologies of 15 kHz, 30 kHz, and 60 kHz, respectively.

In an embodiment, the slot index information and the subframe information of an S-SSB is combined into one field and indicated by a same set of bits carried in the respective S-SSB.

In an embodiment, the slot index information is carried in an S-SSB using sequences of SSS or PSBCH DMRS. For example, different sequences can be selected or generated (e.g., initialized with bits of a slot index) to indicate the slot index information.

In an embodiment, uplink frequencies of paired frequencies or frequency division duplex (FDD) frequencies are used for V2X communication. To facilitate a UE to perform sidelink synchronization, downlink frequency information (e.g., an absolute radio frequency channel number (ARFCN)) and/or band information is signaled to a UE or preconfigured to a UE (e.g., stored in a SIM). Based on those information, the UE can search uplink frequencies corresponding to the known downlink frequencies to perform a synchronization process while in coverage or out of coverage of a BS.

In various embodiments, sidelink synchronization source priority information for indicating a priority of a SLSS can be carried in the SLSS (e.g., S-SSB) in various ways. The sidelink synchronization source priority information can include which type of top-priority source (e.g., GNSS, gNB, or eNB) is used, coverage status of the respective UE (e.g., in-coverage or out-of-coverage), whether no top-priority source is present (e.g., a cluster of UEs are synchronized to a timing reference determined autonomously be a UE), numbers of hops with respect to a top-priority source, and the like.

In an embodiment, part of the synchronization source priority information (e.g. in-coverage or out-of-coverage) is included in a PSBCH of a SLSS. Accordingly, the PBSCH has to be decoded before a priority of the SLSS can be determined. In an embodiment, information bits of the synchronization source priority information can be arranged in special input positions to a polar encoder when polar code is used for channel coding a master information block (MIB) in a PSBCH. In this way, transmission reliability of the respective information bits can be improved, and decoding of those information bits can be accelerated without fully decoding the MIB in the PSBCH.

In an embodiment, instead of a PSBCH, the synchronization source priority information is carried in an S-PSS, an S-SSS, or a PSBCH DMRS of an S-SSB, or a combination of two or three of an S-PSS, an S-SSS, or a PSBCH DMRS of an S-SSB. In this way, the synchronization source priority information can be determined earlier without decoding the PSBCH.

In an embodiment, a sidelink ID for identifying sidelink unicast, groupcast, or broadcast is determined based on different in-coverage or out-of-coverage scenarios. For example, the sidelink ID can be configured to a Tx UE by RRC signaling (e.g., similar to assigning RNTI) or by storage in the Tx UE. The sidelink ID can be used to identify a sidelink of unicast, groupcast, or broadcast when the Tx UE performs sidelink transmissions. Or, in other words, the sidelink ID can be used to identify communications between the UE and an individual UE, or a group of UEs. During a sidelink transmission from the Tx UE, such a sidelink ID can be explicitly carried in a control channel or implicitly carried via CRC scrambling (e.g., a CRC scrambled by such an ID). A Rx UE can know if the transmission is intended for the Tx UE or a group including the Tx UE by detecting or decoding the ID. In addition, the IDs can also be used for other functions including scrambling control or data information over a sidelink, or scrambling control or data DMRS over a sidelink.

The sidelink ID can be a L1-ID (physical layer ID) that is derived from a L2-ID or a higher layer ID, or configured by a higher layer.

In an example, when the Tx UE is in an out-of-coverage status without a serving cell (without presence of a BS) (e.g., the FIG. 3 example), the sidelink ID is used by itself. In contrast, when the Tx UE is an in-coverage status or an our-of-coverage status with a serving cell or BS present (e.g., the FIG. 2 example), the sidelink ID can be scrambled by a cell ID of the serving cell and the resulting ID can be used in place of the sidelink ID.

Figure 14:
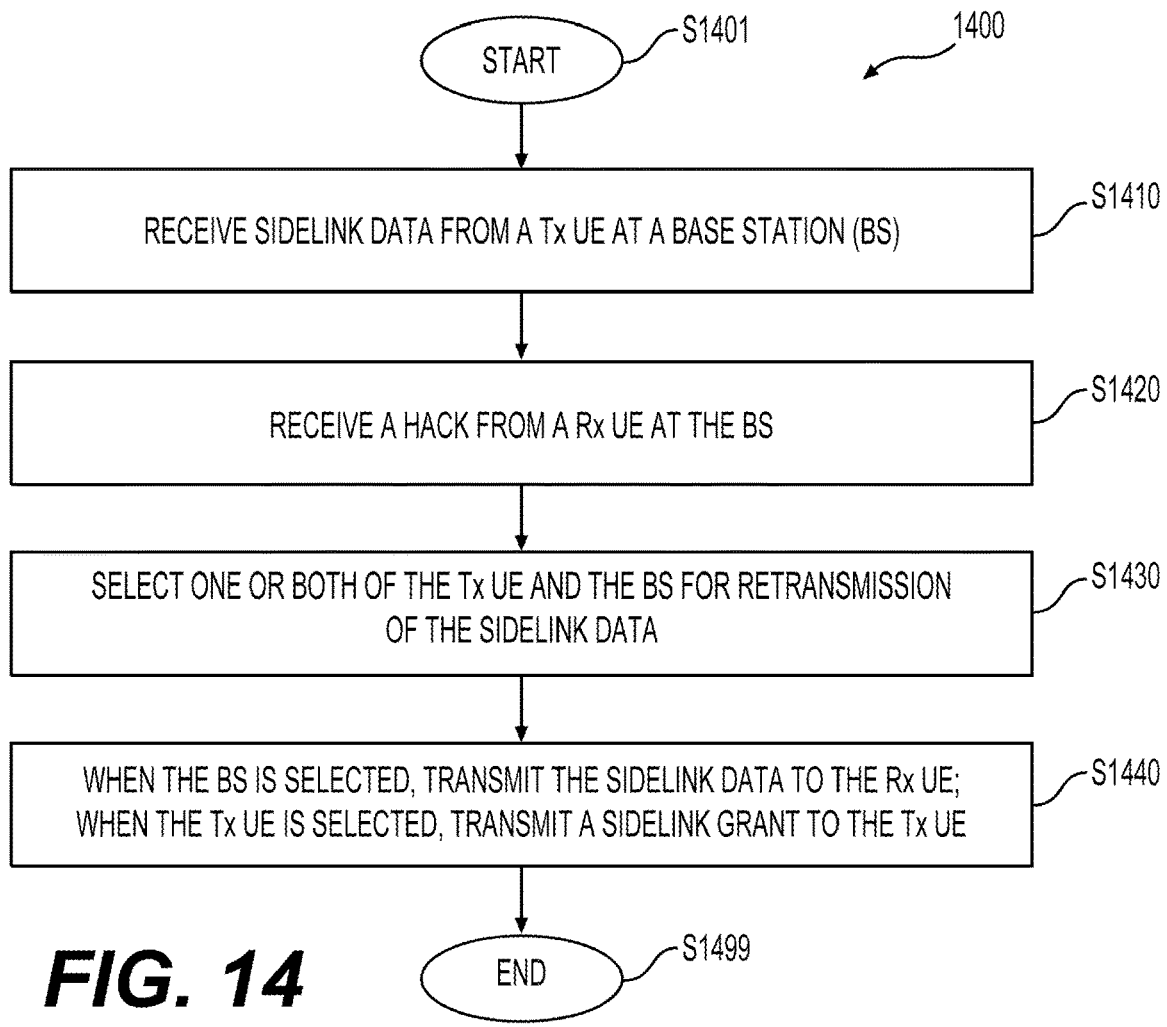
FIG. 14 shows a sidelink data transmission process according to an embodiment of the disclosure.

FIG. 14 shows a sidelink data transmission process 1400 according to an embodiment of the disclosure. The BS 101 and the UEs 102-103 in FIG. 1A and FIG. 1B are used as examples for explanation of the process 1400. The process 1400 can be performed by the BS 101 to dynamically select the BS 101 or the Tx UE 102 to perform a retransmission of sidelink data transmitted from the Tx UE 102 to the Rx UE 103. The selection can be based on channel conditions of the sidelink 120 between the Tx UE 102 and the Rx UE 103, and the Uu link 112 between the BS 101 and the Rx UE 103. The process can start from S1401, and proceed to S1410.

At S1410, the sidelink data can be received at the BS 101. The sidelink data can be transmitted from the Tx UE 102 to the Rx UE 103 over the sidelink 120. As the sidelink 120 operates over the same frequency as the uplink between the Tx UE 102 and the BS 101, the BS 101 can detect and decode a signal of the sidelink data when transmission power of the sidelink data is suitable, and a channel condition over the uplink is above a threshold.

At the S1420, a NACK can be received from the Rx UE 103 at the BS 101. For example, when reception of the sidelink data over the sidelink 120 is failed, the Rx UE 103 can transmit the NACK over the sidelink 120. Because the uplink between the Rx UE 103 and the BS 101 shares a same frequency as the sidelink 120, the BS 101 can receive the NACK when transmission power of the NACK is suitable and a channel condition over the uplink between the Rx UE 103 and the BS 101 is above a threshold.

At S1430, the BS 101 can make a decision to select one or both of the BS 101 and the Tx UE 102 to perform a retransmission of the sidelink data in response to receiving the NACK. The selection can be based on channel conditions of the sidelink 120 and the Uu link 112, for example, as measured by the Rx UE 103. In other examples, other factors may be considered for the selection.

At 1440, when the BS is selected, the BS 101 can retransmit the sidelink data received at S1410 to the Rx UE 103 over the Uu link 112.

When the Tx UE is selected, the BS 101 can transmit a sidelink grant to the Tx UE 102 to allocate radio resources of the sidelink 120 for a retransmission to be performed by the Tx UE 102. Subsequently, the Tx UE 102 can retransmit the sidelink data to the Rx UE 103. The process 1400 can proceed to S1499 and terminates at S1499.

Figure 15:
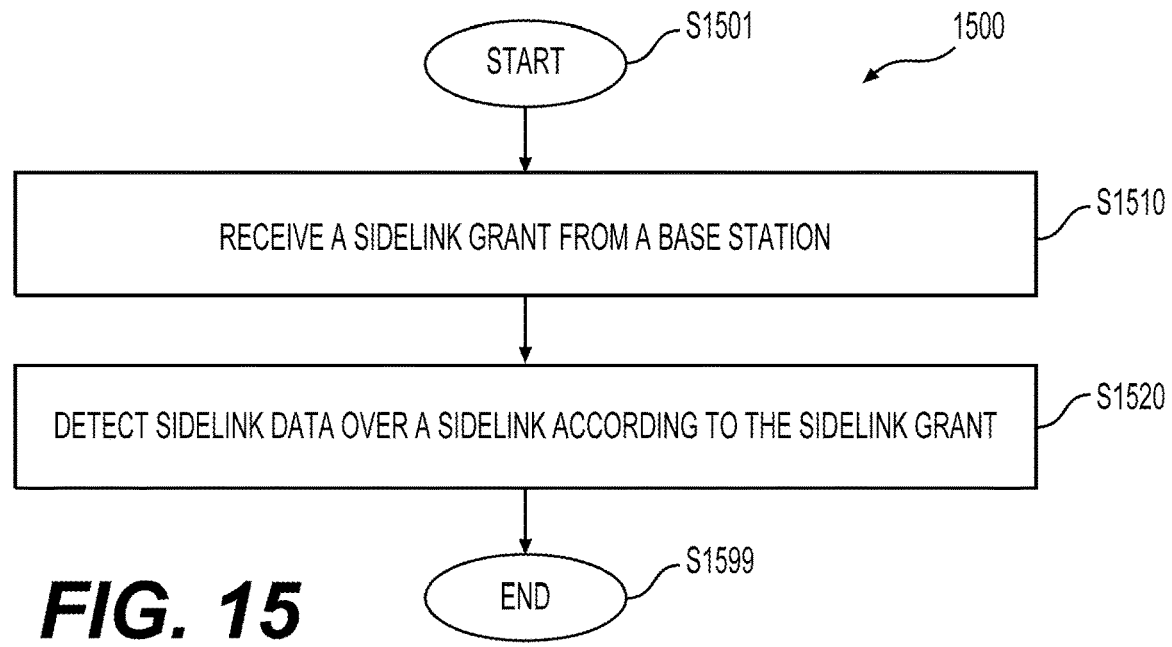
FIG. 15 shows another sidelink data transmission process according to an embodiment of the disclosure.

FIG. 15 shows a sidelink data transmission process 1500 according to an embodiment of the disclosure. The BS 101 and the UEs 102-103 in FIG. 1A and FIG. 1B are used as examples for explanation of the process 1500. The process 1500 can be performed by the Rx UE 103 for reception of sidelink data without receiving resource allocation information (e.g., carried in a sidelink DCI in a PSCCH from the Tx UE 102). The process 1500 can start from S1501, and proceeds to S1510.

At S1510, a sidelink grant can be received from the BS 101 at the Rx UE 103 over the Uu link 112. The sidelink grant can indicate radio resources for transmitting the sidelink data over the sidelink 120 from the Tx UE 102 to the Rx UE 103. For example, the sidelink grant can be carried in a DCI having a CRC scrambled with a common ID known to both the Tx UE 102 and the Rx UE 103. Accordingly, the Tx UE 102 and the Rx UE 103 can detect and decode a PDCCH carrying the DCI, and obtain the sidelink grant.

At S1520, the sidelink data can be detected over the sidelink 120 at the Rx UE 103 according to the sidelink grant. For example, based on the sidelink grant, the Rx UE 103 can know time-frequency domain locations of the radio resources used for transmitting the sidelink data, and a respective MCS. Under such a configuration, transmission of a PSCCH for scheduling resources for transmitting the sidelink data can be avoided. The process 1500 can proceed to S1599 and terminates at S1599.

Figure 16:
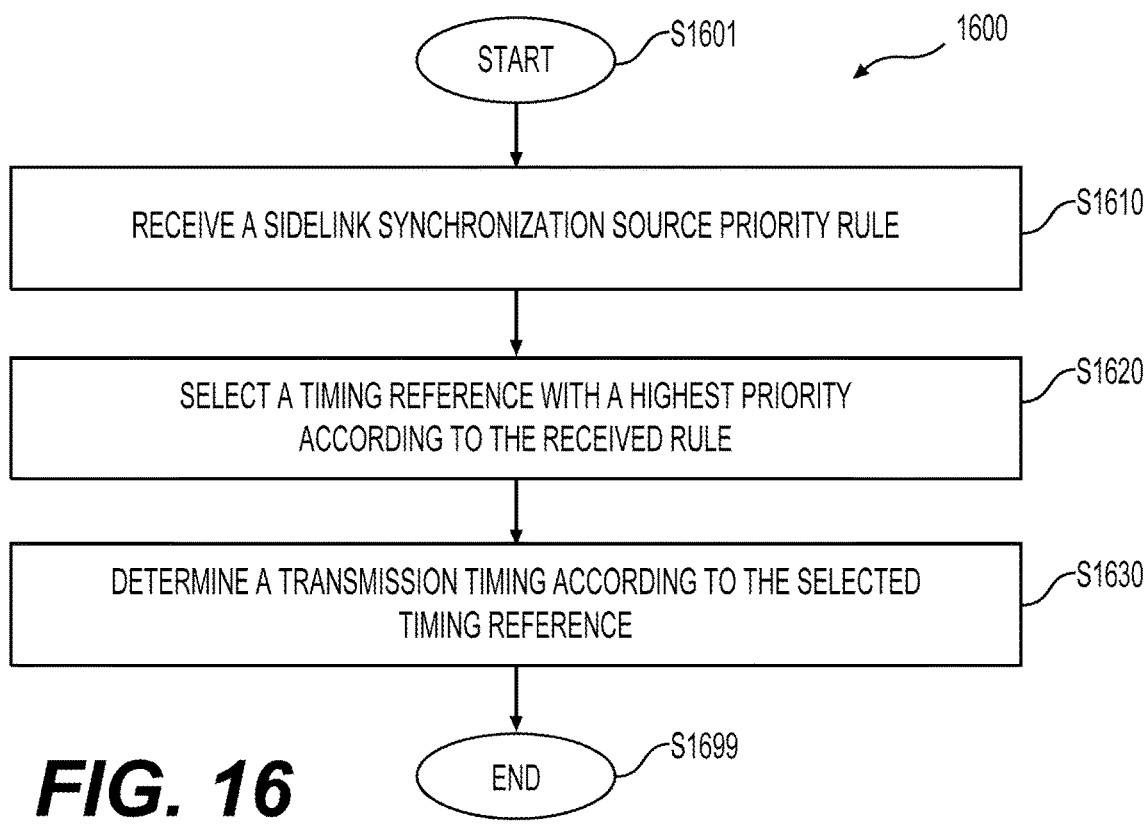
FIG. 16 shows a sidelink synchronization process according to an embodiment of the disclosure.

FIG. 16 shows a sidelink synchronization process 1600 according to an embodiment of the disclosure. The process 1600 can be performed by a UE to select a reference timing and subsequently synchronize to the selected reference timing. The process 1600 can start from S1601, and proceed to S1610.

At S1610, a sidelink synchronization source priority rule can be received at the UE. The received rule can be a gNB/eNB-based rule (e.g., the FIG. 4 example), or a GNSS-based rule (e.g., the FIG. 5 example), depending a deployment preference of a network operator. The rule can be received from a BS, for example, by RRC signaling or system information broadcasting. Alternatively, the rule can be received from a SIM or UICC module, or a memory at the UE. In addition, the rule can be represented by a sidelink synchronization source priority configuration (or rule) derived from or compliant with the rule, similar to the examples show in FIGS. 6-13, considering capabilities of the UE.

At S1620, a timing reference with a highest priority among available sidelink synchronization sources is selected according to the rule received at the S1610. For example, based on a configuration received from a BS or preconfigured to the UE (e.g., stored in a SIM), the UE can know one or more frequencies over which SSs (e.g., an SS from a BS, or SLSS) are transmitted. Accordingly, the UE can tune to those frequencies to detect SSs which can be used as timing references. Those timing references (the SSs) can each carry sidelink synchronization priority information.

According to priorities of different types of synchronization sources specified in the rule, the UE may investigate available SSs near the UE one by one (or more than one at a time) according to an order, and search for an SS with the highest priority. Take the rule of FIG. 4 as an example, the UE can first search for an SS from a gNB or eNB of the priority P0. If no gNB or eNB is found (e.g., no SS from a gNB or eNB exists, or a signal quality of an SS received from a BS is below a threshold), the UE can select a SLSS of a UE directly synchronized to a gNB or an eNB among available SLSSs when the SLSS is available and has a quality above a threshold. This process can continue until an available SLSS with a highest priority is found.

At S1630, a transmission timing can be determined according to the selected timing reference. For example, the UE can adjust a local timing (e.g., a clock) to align with the selected timing reference, and transmit a SLSS according to the local timing. The process 1600 can proceed to S1699 and terminate at S1699.

Figure 17:
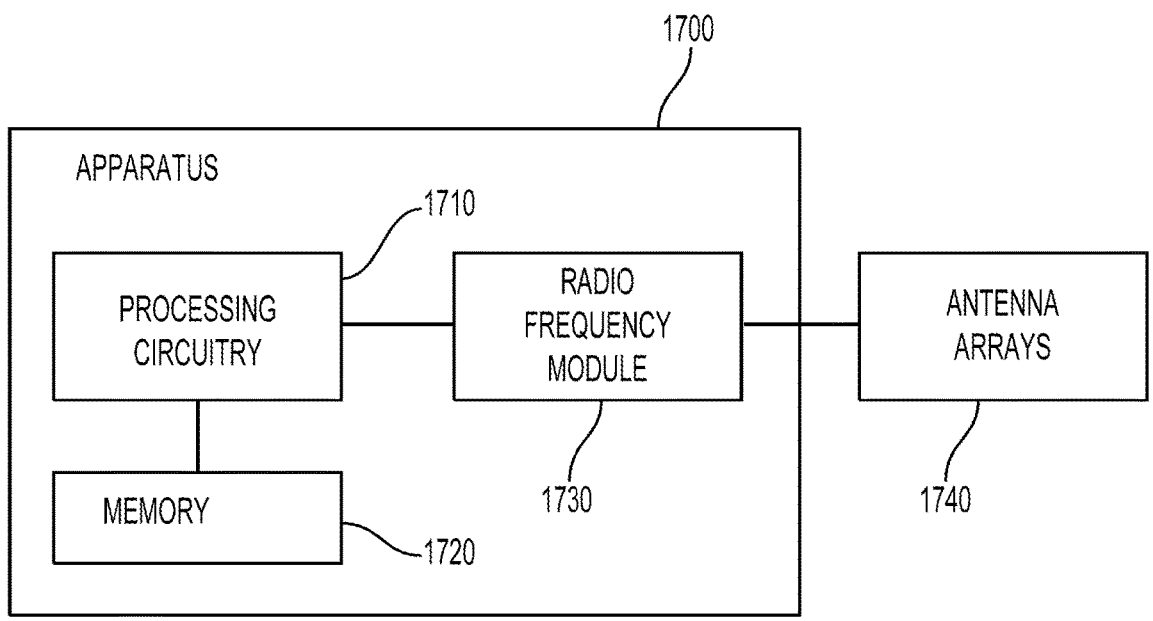
FIG. 17 shows an exemplary apparatus according to embodiments of the disclosure.

FIG. 17 shows an exemplary apparatus 1700 according to embodiments of the disclosure. The apparatus 1700 can be configured to perform various functions in accordance with one or more embodiments or examples described herein. Thus, the apparatus 1700 can provide means for implementation of mechanisms, techniques, processes, functions, components, systems described herein. For example, the apparatus 1700 can be used to implement functions of the UEs 102-103 or the BS 101 in various embodiments and examples described herein. The apparatus 1700 can include a general purpose processor or specially designed circuits to implement various functions, components, or processes described herein in various embodiments. The apparatus 1700 can include processing circuitry 1710, a memory 1720, and a radio frequency (RF) module 1730.

In various examples, the processing circuitry 1710 can include circuitry configured to perform the functions and processes described herein in combination with software or without software. In various examples, the processing circuitry 1710 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1710 can be a central processing unit (CPU) configured to execute program instructions to perform various functions and processes described herein. Accordingly, the memory 1720 can be configured to store program instructions. The processing circuitry 1710, when executing the program instructions, can perform the functions and processes. The memory 1720 can further store other programs or data, such as operating systems, application programs, and the like. The memory 1720 can include non-transitory storage media, such as a read only memory (ROM), a random access memory (RAM), a flash memory, a solid state memory, a hard disk drive, an optical disk drive, and the like.

In an embodiment, the RF module 1730 receives a processed data signal from the processing circuitry 1710 and converts the data signal to beamforming wireless signals that are then transmitted via antenna arrays 1740, or vice versa. The RF module 1730 can include a digital to analog convertor (DAC), an analog to digital converter (ADC), a frequency up convertor, a frequency down converter, filters and amplifiers for reception and transmission operations. The RF module 1730 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1740 can include one or more antenna arrays.

The apparatus 1700 can optionally include other components, such as input and output devices, additional or signal processing circuitry, and the like. Accordingly, the apparatus 1700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
   receiving a first negative acknowledgement (NACK) at a base station (BS) from a receiver user equipment (Rx UE), the NACK corresponding to an original transmission of sidelink data over a sidelink from a transmitter user equipment (Tx UE);
   selecting one or both of the BS and the Tx UE to perform a first retransmission of the sidelink data to the Rx UE;
   when the BS is selected to perform the first retransmission of the sidelink data to the Rx UE, transmitting the sidelink data to the Rx UE from the BS; and
   when the Tx UE is selected to perform the first retransmission of the sidelink data to the Rx UE, transmitting a first sidelink grant from the BS to the Tx UE for the first retransmission of the sidelink data to the Rx UE.

2. The method of claim 1, wherein the selecting one or both of the BS and Tx UE is based on whether the BS has received the sidelink data of the original transmission.

3. The method of claim 1, further comprising:
   executing power control to the Rx UE such that the BS is able to receive the NACK from the Rx UE.

4. The method of claim 1, wherein the selecting one or both of the BS and Tx UE is based on channel conditions of the sidelink between the Tx UE and the Rx UE, and a Uu link between the Rx UE and the BS, determined at the Rx UE.

5. The method of claim 1, further comprising:
   receiving a second NACK from the Rx UE corresponding to the first retransmission of the sidelink data to the Rx UE from the Tx UE; and
   selecting the BS to perform a second retransmission of the sidelink data to the Rx UE.

6. The method of claim 5, further comprising:
   receiving the sidelink data of the original transmission from the Tx UE at the BS;
   receiving the sidelink data of the first retransmission from the Tx UE at the BS; and
   performing soft combining of the sidelink data of the original transmission and the first retransmission at the BS.

7. The method of claim 1, further comprising:
   transmitting from the BS a second sidelink grant included in a downlink control information (DCI) having a cyclic redundancy check (CRC) scrambled with a common identifier know to both the Tx UE and the Rx UE, the second sidelink grant indicating radio resources over the sidelink for the original transmission of the sidelink data.

8. The method of claim 7, wherein a number of time and frequency resources for transmitting the second sidelink grant is determined based on a worse one of channel conditions of a first Uu link between the Tx UE and the BS and a second Uu link between the Rx UE and the BS.

9. A method, comprising:
   receiving a sidelink grant from a base station (BS) at a receiver user equipment (Rx UE) indicating radio resources for transmission of sidelink data over a sidelink from a transmitter user equipment (Tx UE) to the Rx UE;
   detecting at the Rx UE the sidelink data transmitted over the sidelink at the radio resources indicated by the sidelink grant received from the BS; and
   transmitting a buffer status of the Rx UE in a physical sidelink shared channel (PSSCH) transmitted over the sidelink from the Rx UE to the Tx UE.

10. The method of claim 9, wherein the sidelink grant received from the BS is included in a downlink control information (DCI) having a cyclic redundancy check (CRC) scrambled with a common identifier know to both the Tx UE and the Rx UE.

11. The method of claim 9, further comprising:
    transmitting a positive or negative acknowledgement (ACK/NACK) corresponding to reception of the sidelink data transmitted from the Tx UE, the ACK/NACK being carried in a PSSCH transmitted over the sidelink from the Rx UE to the Tx UE.

12. The method of claim 9, further comprising:
    transmitting a sidelink scheduling request in a PSSCH transmitted over the sidelink from the Rx UE to the Tx UE.

13. The method of claim 9, further comprising:

transmitting a buffer status of the Rx UE in a media access control (MAC) control element (CE) of a transport block carried in a PSSCH transmitted over the sidelink from the Rx UE to the Tx UE.

14. The method of claim 9, further comprising:

receiving a resource allocation carried in a PSSCH from the Tx UE indicating radio resources for transmission and/or reception over the sidelink between the Tx UE and the Rx UE.

15. A receiver user equipment (Rx UE), comprising circuitry configured to:

receiving a sidelink grant from a base station (BS) at the Rx UE indicating radio resources for transmission of sidelink data over a sidelink from a transmitter user equipment (Tx UE) to the Rx UE;

detecting at the Rx UE the sidelink data transmitted over the sidelink at the radio resources indicated by the sidelink grant received from the BS; and transmitting a buffer status of the Rx UE in a physical sidelink shared channel (PSSCH) transmitted over the sidelink from the Rx UE to the Tx UE.

16. The receiver user equipment of claim 15, wherein the sidelink grant received from the BS is included in a downlink control information (DCI) having a cyclic redundancy check (CRC) scrambled with a common identifier know to both the Tx UE and the Rx UE.

17. The receiver user equipment of claim 15, wherein the circuitry is further configured to:

transmitting a positive or negative acknowledgement (ACK/NACK) corresponding to reception of the sidelink data transmitted from the Tx UE, the ACK/NACK being carried in a PSSCH transmitted over the sidelink from the Rx UE to the Tx UE.

18. The receiver user equipment of claim 15, wherein the circuitry is further configured to:

transmitting a sidelink scheduling request in a PSSCH transmitted over the sidelink from the Rx UE to the Tx UE.

\* \* \* \* \*